US009255989B2

(12) United States Patent
Joshi et al.

(10) Patent No.: US 9,255,989 B2
(45) Date of Patent: Feb. 9, 2016

(54) TRACKING ON-ROAD VEHICLES WITH SENSORS OF DIFFERENT MODALITIES

(75) Inventors: Avdhut S. Joshi, Ann Arbor, MI (US); Michael R. James, Northville, MI (US); Michael E. Samples, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 13/556,802

(22) Filed: Jul. 24, 2012

(65) Prior Publication Data
US 2014/0032012 A1 Jan. 30, 2014

(51) Int. Cl.
*G01S 13/93* (2006.01)
*G01S 13/86* (2006.01)
*G05D 1/02* (2006.01)
*G08G 1/16* (2006.01)

(52) U.S. Cl.
CPC ............ *G01S 13/931* (2013.01); *G01S 13/865* (2013.01); *G05D 1/0257* (2013.01); *G05D 1/0274* (2013.01); G05D 2201/0213 (2013.01); G08G 1/166 (2013.01)

(58) Field of Classification Search
CPC ... B60W 30/095; B60W 40/02; B60W 50/16; B25J 9/1085; B64C 2201/021; B64C 2201/044; B64C 2201/048; G01S 2013/9346; G01S 2013/9353; G01S 2013/936; G01S 3/80; G01S 13/68; G01S 13/87; G01S 13/72; G01S 15/025; G01S 5/0294; H04L 29/06; H04L 67/10; H04L 67/125; H04L 69/329; G08B 13/19645; G08B 13/19673

USPC ........ 244/3.16; 340/539.13; 342/145, 357.29, 342/357.74, 424, 70, 95; 375/150; 701/1, 2, 701/3, 25, 301, 466, 468, 494, 50; 705/14.1, 75

See application file for complete search history.

(56) References Cited

U.S. PATENT DOCUMENTS 5,343,206 A 8/1994 Ansaldi et al.
6,420,997 B1 * 7/2002 Cong ............................ 342/70

(Continued)

OTHER PUBLICATIONS

Rasshofer et al., "Automotive Radar and Lidar Systems for Next Generation Driver Assistance Functions," Advances in Radio Science, 3, 2005, pp. 205-209.

(Continued)

*Primary Examiner* — Helal A Algahaim
*Assistant Examiner* — Jelani Smith
(74) *Attorney, Agent, or Firm* — Oblon, McClelland, Maier & Neustadt, L.L.P.

(57) ABSTRACT

A vehicle system includes a first sensor and a second sensor, each having, respectively, different first and second modalities. A controller includes a processor configured to: receive a first sensor input from the first sensor and a second sensor input from the second sensor; detect, synchronously, first and second observations from, respectively, the first and second sensor inputs; project the detected first and second observations onto a graph network; associate the first and second observations with a target on the graph network, the target having a trajectory on the graph network; select either the first or the second observation as a best observation based on characteristics of the first and second sensors; and estimate a current position of the target by performing a prediction based on the best observation and a current timestamp.

13 Claims, 12 Drawing Sheets
(3 of 12 Drawing Sheet(s) Filed in Color)

(56) References Cited

U.S. PATENT DOCUMENTS

| | | |
|---|---|---|
| 6,894,605 B2 | 5/2005 | Isogai et al. |
| 7,417,580 B2 | 8/2008 | Abe et al. |
| 2002/0015439 A1* | 2/2002 | Kohli et al. ............... 375/148 |
| 2002/0022927 A1* | 2/2002 | Lemelson et al. ........... 701/301 |
| 2002/0097635 A1* | 7/2002 | LaRosa et al. .............. 367/130 |
| 2004/0006424 A1* | 1/2004 | Joyce et al. ................ 701/207 |
| 2005/0055417 A1* | 3/2005 | Reich et al. ................ 709/208 |
| 2008/0113672 A1* | 5/2008 | Karr et al. ................ 455/456.1 |
| 2008/0300787 A1* | 12/2008 | Zeng ......................... 701/301 |
| 2009/0079839 A1 | 3/2009 | Fischer et al. |
| 2009/0087029 A1* | 4/2009 | Coleman et al. ............. 382/103 |
| 2010/0235129 A1 | 9/2010 | Sharma et al. |
| 2010/0253597 A1 | 10/2010 | Seder et al. |
| 2011/0025684 A1* | 2/2011 | Lima et al. ................. 345/419 |
| 2012/0072050 A1 | 3/2012 | Naka |
| 2012/0310451 A1* | 12/2012 | Kerhuel et al. ................ 701/3 |
| 2013/0030606 A1* | 1/2013 | Mudalige et al. .............. 701/2 |
| 2013/0151135 A1* | 6/2013 | Aubrey et al. ............... 701/118 |

OTHER PUBLICATIONS

Homeier et al., "RoadGraph: High level sensor data fusion between objects and street network," 14$^{th}$ International IEEE Conference on Intelligent Transportation Systems, Oct. 2011, pp. 1380-1385.

Coifman et al., "A real-time computer vision system for vehicle tracking and traffic surveillance," Transportation Research Part C 6, 1998, pp. 271-288.

Mahlisch et al., "Heterogeneous Fusion of Video, LIDAR and ESP Data for Automotive ACC Vehicle Tracking," 2006 IEEE International Conference on Multisensor Fusion and Integration for Intelligent Systems, Sep. 2006, pp. 139-144.

\* cited by examiner

US 9,255,989 B2

TRACKING ON-ROAD VEHICLES WITH SENSORS OF DIFFERENT MODALITIES

This application relates to autonomous and/or automated vehicle or automotive systems. US Patent Application Publication Number 2011/0282581, filed May 12, 2012, discusses a method and system for detecting and tracking objects near a vehicle using a laser rangefinder, and is herein incorporated by reference in its entirety.

BACKGROUND

Summary of Illustrative Embodiments

In a two-dimensional (2D) tracking system, targets are free to occupy any point in 2D space and hence the motion from one update cycle to another can be arbitrary and difficult to model. This can make a tracking system unstable and difficult to tune.

In one aspect of this disclosure, a tracking system can be restrained to a lane network graph (herein referred to simply as a graph) that is a predefined map, along which an object to be tracked can move. This can incorporate motion of on-road automotive vehicles and motion of other vehicles that generally abide by a lane network. Also, since only one-dimension (1D) along the graph is used to track targets, a state space for filters can be small and can be easy to tune, which can enable very efficient implementations.

In some aspects, data from different sensors is received asynchronously, and the received data can be correctly integrated together in a tracking system. Characteristics of different sensors can be leveraged to correctly filter out noisy data from the tracking system.

A vehicle system can include a first sensor and a second sensor, each having, respectively, different first and second modalities. A controller can include a processor configured to: receive a first sensor input from the first sensor and a second sensor input from the second sensor; detect, synchronously, first and second observations from, respectively, the first and second sensor inputs; project the detected first and second observations onto a graph network; associate the first and second observations with a target on the graph network, the target having a trajectory on the graph network; select either the first or the second observation as a best observation based on characteristics of the first and second sensors; and estimate a current position of the target by performing a prediction based on the best observation and a current timestamp.

The first and second observations can be associated with the target by generating a new target on the graph network when the first and second observations are not within a predefined distance of a currently tracked target.

The processor can be further configured to generate the graph network from a road map and an acquired position, such that the graph network includes one dimensional lanes as links between nodes, wherein the trajectory of the target is based on one of the one dimensional lanes.

The first sensor can be a lidar sensor, and the second sensor can be a radar sensor.

The current position of the target can be estimated by performing a Kalman filter prediction process.

The characteristics of the first and second sensors can include a time delay for processing the sensor data and an accuracy in detecting valid obstacles by the processing of the sensor data.

The target (e.g., a vehicle) can be tracked, by current position updates, through successive observations by the first and second sensors. The target can be removed from being tracked when no observation is observed for the target for a defined time period.

The detected first and second observations can be projected onto the graph network by transforming respective coordinate systems of the first and second sensor inputs into a common coordinate system of the vehicle, such as UTM.

The controller can store a list of targets in a target list in a memory of the controller, and the target list can be queried to associate observations with the targets.

Synchronous detection of observations can be restricted to points on or within a margin of error from a lane of the graph network. Similarly, tracking of targets can be restricted to points on or within a margin of error from a lane of the graph network.

The detected first and second observations can be projected onto the graph network by correcting the detected first and second observations to reflect a current timestamp. This can include adjusting a position of the first and second observations on the graph network to account for a time delay between acquiring respective sensor data and projecting resulting observations onto the graph network. An amount of the adjustment can be determined by using a calibrated (predefined) time delay and a velocity of the target associated with the first and second observations.

The foregoing general description of the illustrative embodiments and the following detailed description thereof are merely exemplary aspects of the teachings of this disclosure, and are not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
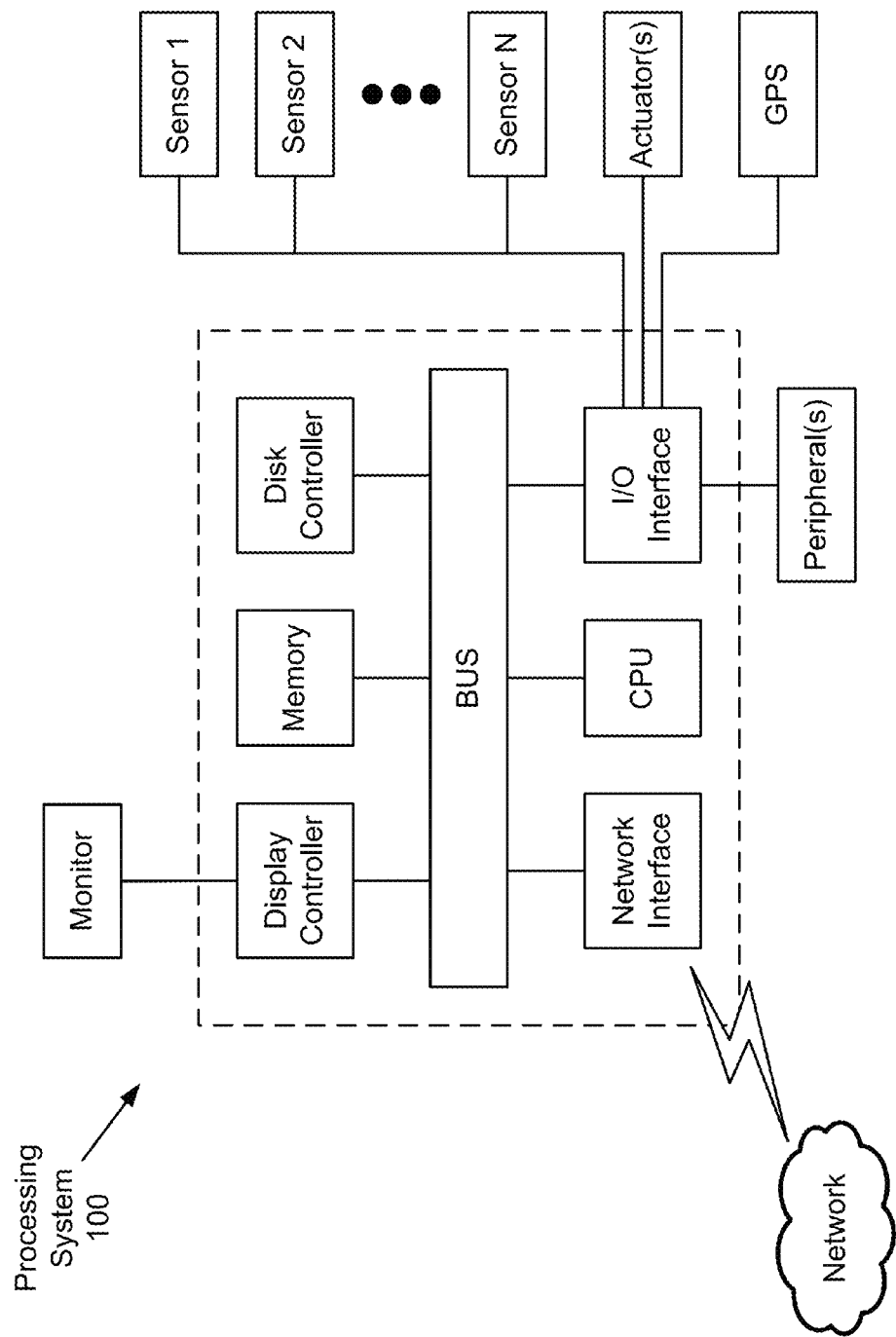
FIG. 1 schematically illustrates a processing system for a controller and/or a computer system.

In the drawings, like reference numerals designate identical or corresponding parts throughout the several views.

FIG. 1 illustrates an exemplary processing system 100, and illustrates exemplary hardware found in a controller or computing system for implementing and/or executing the processes, algorithms and/or methods described in this disclosure. The system 100 can be embodied and/or implemented as an electronic control unit (ECU) or a discrete computer installed in a vehicle.

As shown in FIG. 1, a processing system 100 in accordance with this disclosure can be implemented using a microprocessor or its equivalent, such as a central processing unit (CPU) and/or at least one application specific processor ASP (not shown). The microprocessor utilizes a computer readable storage medium, such as a memory (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU.

In another aspect, results of processing in accordance with this disclosure can be displayed via a display controller to a monitor. The display controller would then preferably include at least one graphic processing unit for improved computational efficiency. Additionally, an I/O (input/output) interface is provided for inputting sensor data from Sensors 1, 2 . . . N, and for outputting control signals to one or more actuators to control various actuated components, including steering, brake and throttle controllers/actuators of a vehicle. A global positioning system (e.g., GPS) can be provided and connected to the I/O interface for location information of the vehicle.

Further, as to other input devices, the same can be connected to the I/O interface as a peripheral. For example, a keyboard or a pointing device (not shown) for controlling parameters of the various processes and algorithms of this disclosure can be connected to the I/O interface to provide additional functionality and configuration options, or control display characteristics. Moreover, the monitor can be provided with a touch-sensitive interface to a command/instruction interface.

The above-noted components can be coupled to a network, as shown in FIG. 1, such as the Internet or a local intranet, via a network interface for the transmission or reception of data, including controllable parameters. The network can also be a vehicle local area network (VLAN), in which input/output data (e.g., sensor, actuator data/commands, and GPS information) are transmitted via the VLAN. A central BUS is provided to connect the above hardware components together and provides at least one path for digital communication there between.

Figure 2:
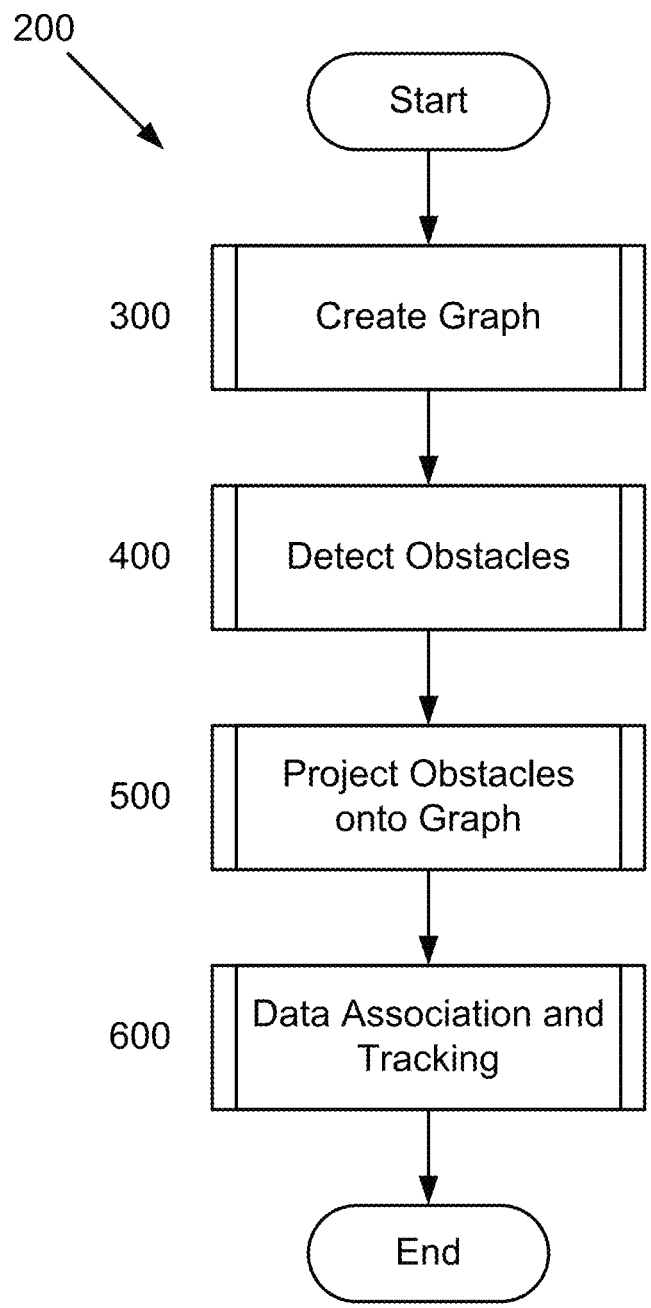
FIG. 2 illustrates an algorithm.

An exemplary algorithm 200 executed by the system shown in FIG. 1 is illustrated in FIG. 2. The algorithm 200 includes a process of creating a graph network at 300, a process of detecting obstacles at 400, a process of projecting the obstacles onto the graph network at 500, and performing data association and tracking at 600. Further exemplary details of the algorithm 200 are described below with reference to FIGS. 3-9.

Figure 3:
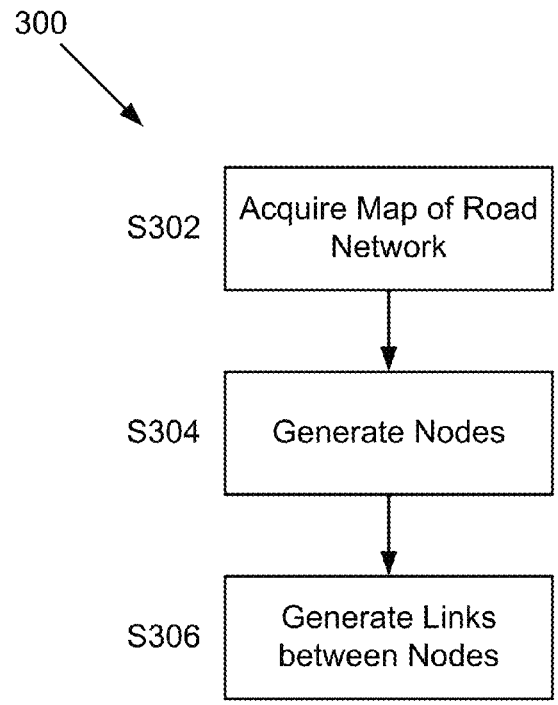
FIG. 3 illustrates a graph creation process of the algorithm.

FIG. 3 illustrates further details of process 300. In creating a graph network, a map of a road network (i.e. of an area in which the vehicle is present) is acquired or accessed at S302. The map of the road network may be pre-installed in the system 100 as part of a navigation system, or accessed by the system 100. Such access can be provided through a network connection to a navigation system or another map database stored locally or remotely (e.g., by downloading a local map from a remote server through a network connection. The network graph is generated using this local map. This graph network consists of nodes which are positions in a global coordinate system (e.g., UTM), and links which define the connectivity of these nodes. The nodes are generated at S304, and the links are generated at S306. The generation of the nodes and the links can be generated synchronously or asynchronously. Tracking of obstacles (such as other vehicles) is performed along the graph network.

Figure 4:
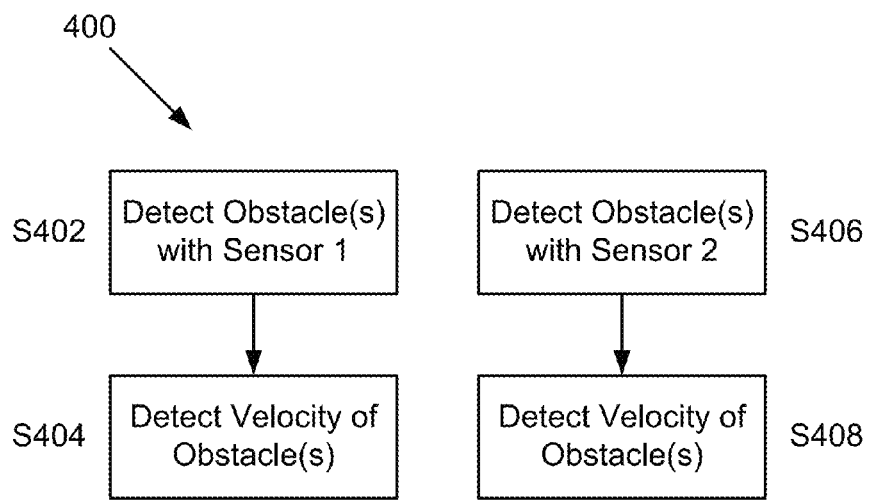
FIG. 4 illustrates an obstacle detection process of the algorithm.

Process 400 is explained in further detail by FIG. 4, which illustrates implementations with multiple sensors for vehicle detection. In particular, vehicles are detected using multiple sensors independently. In the example shown by process 400 by FIG. 4, there are two sensors, Sensor 1 and Sensor 2. However, this can be expanded include further sensors. Further, when one or more of the sensors is lidar (light detection and ranging), point cloud segmentation methods are used to detect vehicles from other obstacles. Object detection and recognition can include aspects of edge and shape detection and recognition, also incorporating other known aspects of object segmentation and recognition. When one or more of the sensors is a camera, computer vision techniques are used to detect vehicles. These techniques can include object recognition, including shape and edge detection. Both lidar and camera recognition processes can be performed based on trained and/or predefined libraries of data, with known and recognizable shapes and edges of obstacles (e.g. vehicles, cyclists, etc.). Radar sensors can report detected obstacles along with a velocity of the obstacles.

In process 400, obstacles can be detected by Sensor 1 at S402, and a velocity of the obstacles can be detected/determined at S404. Synchronously, obstacles can be detected by Sensor 2 at S406, and a velocity of the obstacles can be detected/determined at S408. That is, obstacles (e.g., vehicles, cyclists, etc.) can be synchronously detected by Sensors 1 and 2 (as well as further sensors). Obstacle velocity can be determined by, e.g., radar, as discussed above. Velocity can also be extrapolated by successive position detection measurements and calculating speed and/or direction of motion based thereon.

Figure 5:
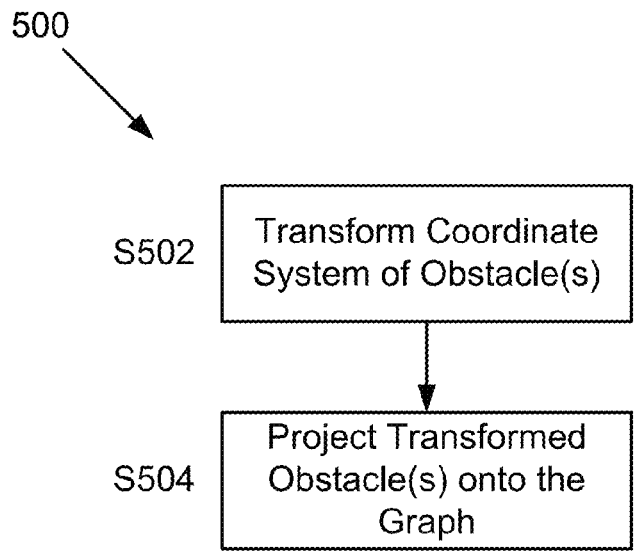
FIG. 5 illustrates an obstacle projection process of the algorithm.

Projection of the obstacles onto the graph network is explained with reference to process 500 illustrated in FIG. 5. At S502, obstacles detected by each sensor are transformed into a common/same coordinate system. In particular, a calibration can be carried out for transforming data from different sensors to the vehicle's coordinate system. These transformed obstacles are then projected on the graph network at S504 by, e.g., using a nearest neighbor technique. The location of the vehicle is determined using GPS+ inertial systems, including a GPS receiver, accelerometers and gyroscopes. Other vehicle location tracking devices can be used, either in addition or supplementary to GPS or other satellite-based navigation systems.

Figure 6:
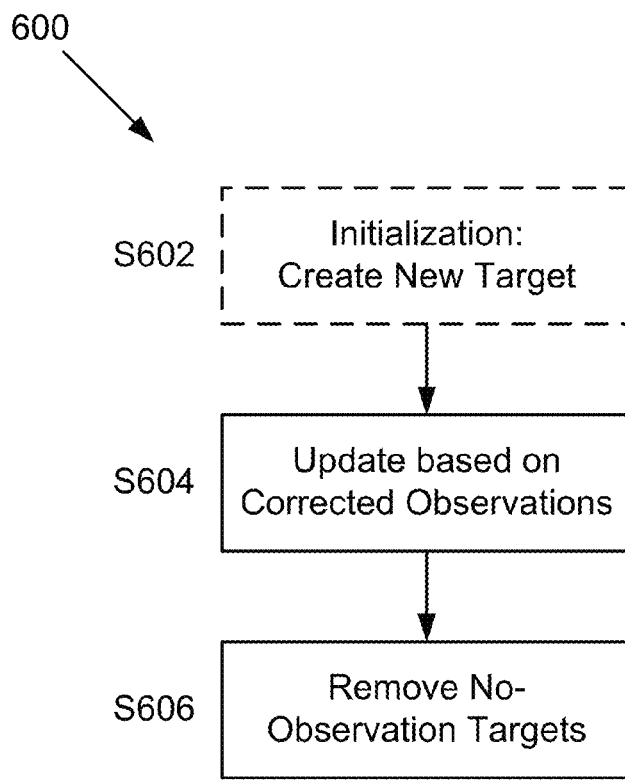
FIG. 6 illustrates a data association process of the algorithm.

FIG. 6 illustrates process 600 to describe data association and tracking. Each obstacle may have multiple observations from different sensors, and these multiple observations are fused. Further, since the sensors work asynchronously, a simple nearest neighbor approach is not used. In order to do a correct temporal assignment, each observation is projected and corrected along the graph network for the current timestamp. These corrected observations are then associated with a current list of targets using the nearest neighbor assignment, which is stored in a memory of the system 100. Multiple observations are assigned to the list of observations for each target, and each target has a probabilistic tracker associated with it, such as a Kalman filter.

The process 600 can include an initialization phase at S602. In the initialization, if no target is assigned for a valid observation, then a new target is created. Its Kalman state is initialized to a corrected observation. A state of the Kalman filter is a travel distance along the lane, velocity and acceleration of the obstacle. In case of observations coming from sensors which do not record the velocity, the velocity is estimated in a first couple of iterations.

An update phase is performed at S604, where a best observation is selected from a list of observations for each target. This best observation is then used to update the Kalman filter. The best observation can be determined by correlating an observation with an expected position of a target, based on velocity and the graph network. That is, targets can be expected to exist directly on the graph network and to have traveled an estimated distance along the graph network based on the determined velocity. The best observation can also be based on time-delay (delay in processing the sensor data to detect an object), and sensor accuracy. Kalman filtering can be utilized for making path and observation predictions.

At S606, if no observation is observed for a certain period of time for a given target, that target can be dropped from the tracking system. That is, that target can be removed from the list. The target may then be re-created at the initialization phase when observations resume.

In some aspects, the algorithm can be summarized as follows:

1. Assign all observations with their corresponding timestamps to the list of observations.
2. For each observation:
   a. If the observation is close enough to the graph, project the observation on the graph.
   b. For each trajectory in the list:
      i. Estimate the position of the trajectory at the timestamp of the observations.
      ii. Assign the observation to the trajectory if it is close to the position of the trajectory at that timestamp.
      iii. If no trajectory is found, create a new trajectory and assign the current observation to the trajectory.
3. For each trajectory in the list:
   a. Select the best observation from the list of observations assigned to the trajectory. This best selection can be carried out heuristically based on sensor accuracy, time delay, etc.
   b. Perform a Kalman filter prediction (prior) step to the timestamp of best observations. This could move the filter back in time.
   c. Perform a Kalman filter measurement (posterior) update using the true value of the observation.
   d. Perform a Kalman filter prediction step again to the current timestamp value to estimate the current position on the trajectory.

Several of the features provided by the above-discussed algorithm(s) are: graph based tracking instead of full 2 dimensional tracking, making the tracking more efficient and more robust against false tracking targets; correct sensor fusion for obstacles detected asynchronously using different sensors; and integrating a probabilistic tracker in the system.

Figure 7:
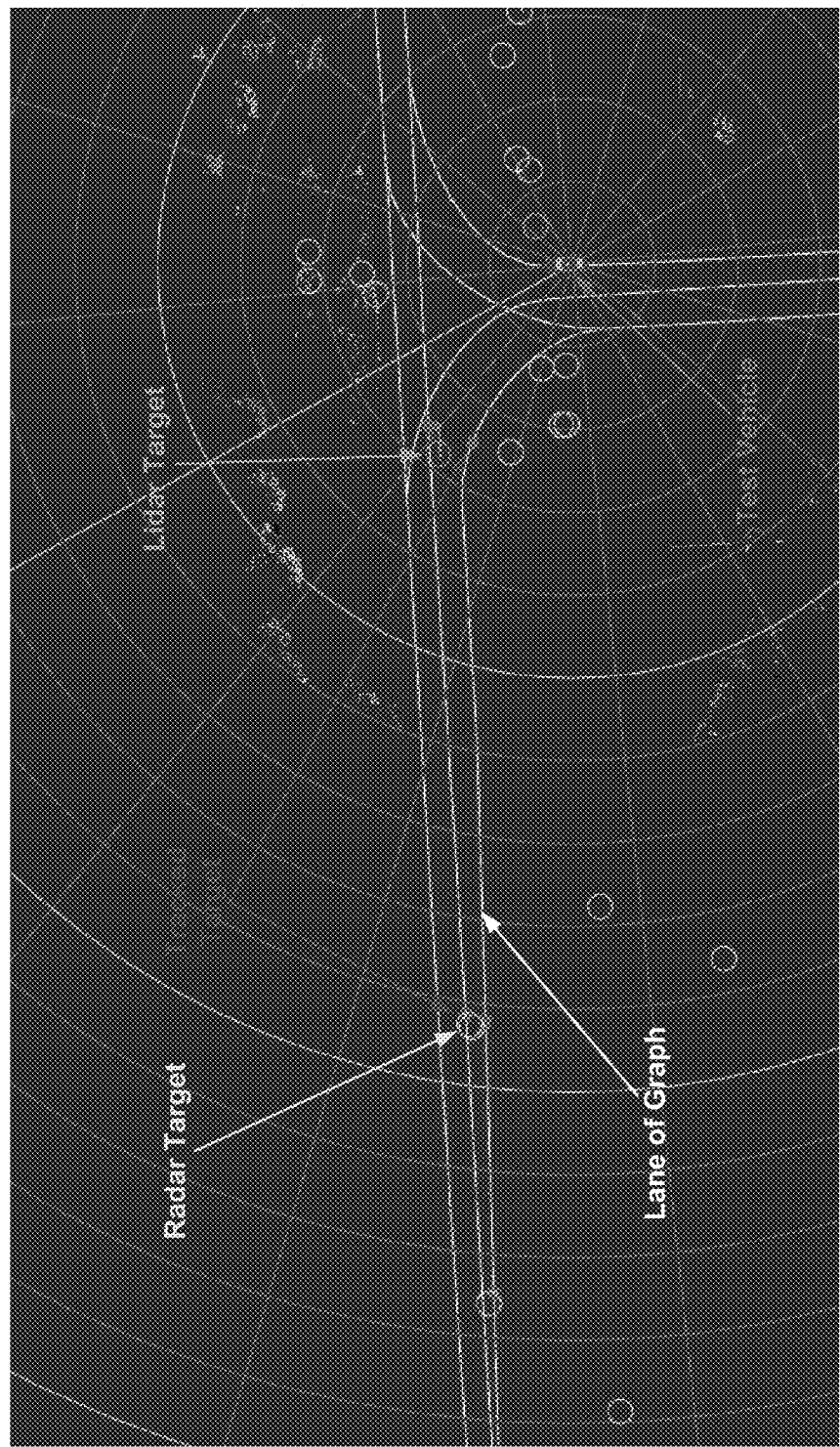
FIGS. 7-9 are graphical illustrations of a tracking system operating in tracking various targets with various sensors.
Figure 8:
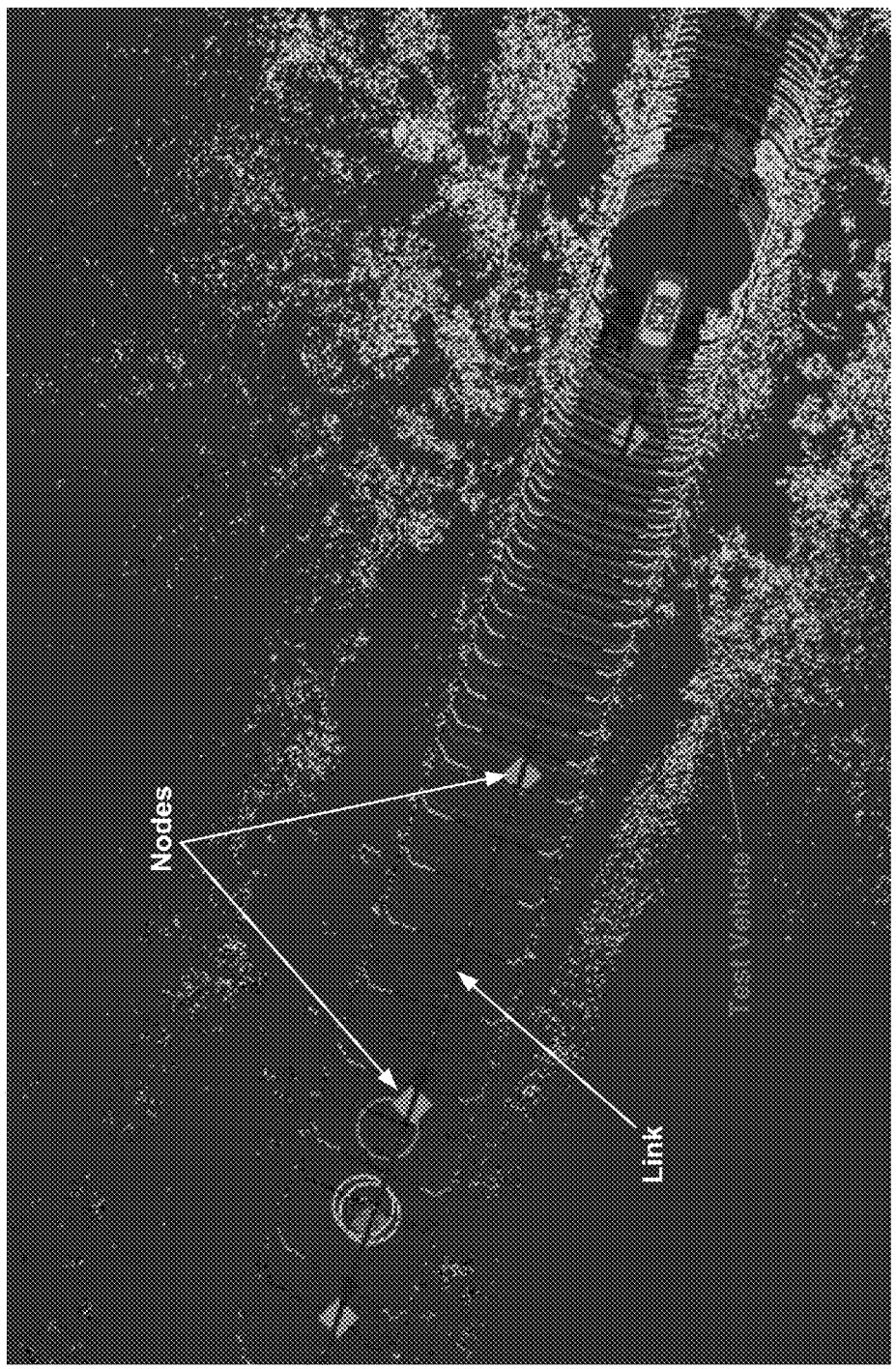
Figure 9:
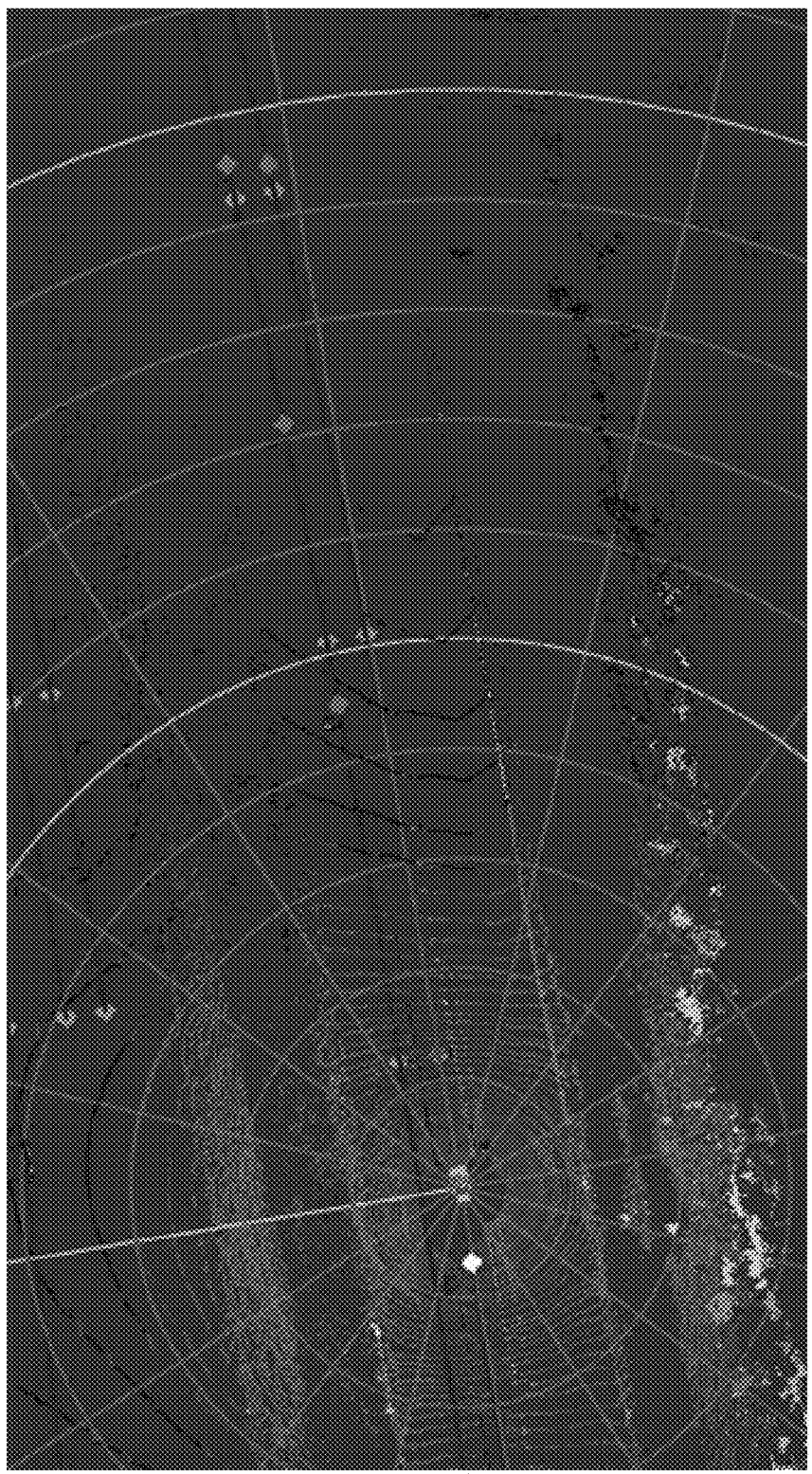

Various implementations of the above-discussed algorithm(s) are shown in FIGS. 7-9, which are graphical illustrations of the tracking system operating in tracking various targets with various sensors. These figures illustrate an implementation utilizing a lidar and a radar. However, other sensors can be utilized. In FIGS. 7-9, yellow indicates a radar target, green indicates a lidar target, and the test vehicle is indicated by blue. The graph network, and specifically a lane of the graph network, is outlined in white. Various targets, which can be identified by processing only those lidar and radar targets that appear on (or within a margin of error of) the lane of the graph network, are shown in red (red diamonds).

FIG. 8 illustrates exemplary links (blue lines) and nodes (yellow diamonds), and exemplifies asynchronous/delay observations. The nodes can also be explained as a series of dots between the yellow diamonds, which are connected by the blue lines. Yellow circles are radar observations, and green circles are lidar observations, which are delayed due to processing. A final graph target (red diamond) is nonetheless correctly updated, by taking into account the delay in lidar processing compared to radar processing. FIG. 9 illustrates a highway implementation, where red diamonds show tracked targets. The display of the system 100 can be configured to display the graph network with corresponding tracked targets identified thereon, where FIGS. 7-9 can be examples of such a display.

Based on results of target tracking, the system 100 can generate appropriate outputs. For example, collision warnings can be generated and output to an audio and/or visual system of the vehicle when a tracked target is tracked as having a predefined probability of collision with the vehicle. For collision determination, path planning can be implemented using a time-horizon prediction process for predicting a path of the tracked target. Such calculations can be performed by another system in communication with the system 100. Further, results of target tracking can be input to a cruise control system, to adjust an automated speed or direction of the vehicle based on the positions of the tracked targets. That is, the system 100 can output control commands to an accelerator actuator, a brake actuator and/or a steering actuator to control the speed and direction of the vehicle based on the results of target tracking. As such, the system 100 can be implemented into a robotic autonomous vehicle capable of self-guidance and collision avoidance.

In exemplary implementations, for autonomous driving, tracking other vehicles on the road is a critical component. In order to plan safe driving maneuvers in both highway and urban traffic scenarios, information about location and motion of other vehicles on the road is required. According to aspects of this disclosure, a graph based vehicle tracking system using multiple sensors (Radar and Lidar) is provided and was successfully tested as a part of an autonomous vehicle research project.

In particular, using a map of a road network, a graph is generated as a pre-processing step. Obstacles obtained from different sensors of different modalities are tracked, by a tracker, along the graph using a probabilistic filter. Output from the tracker includes a location and expected motion of all dynamic obstacles, which is used by a planner to plan a safe driving maneuver.

A road network may be defined using a data structure called a Road Network Definition File (RNDF), which consists of a set of waypoints in the UTM coordinate system and linking information of these waypoints to create lanes, exits, merges, etc. Also, other semantic information like stop signs and traffic light positions are embedded in the data structure. This information is used by the planner to generate a route.

A graph, which is used for tracking, is generated from this RNDF data. Each node in the graph corresponds to a waypoint in the RNDF. The same linking structure is maintained to connect the nodes in the RNDF. In case of merges and exits, links, nodes are interpolated using spline-fitting between end points of links and which are added to the graph.

Additionally, travel distance from the start of a lane to which the waypoint belongs is stored in each node. The travel distance is the distance along the graph, rather than a direct Euclidian distance, which is then used for tracking obstacles along the graph.

Figure 10:
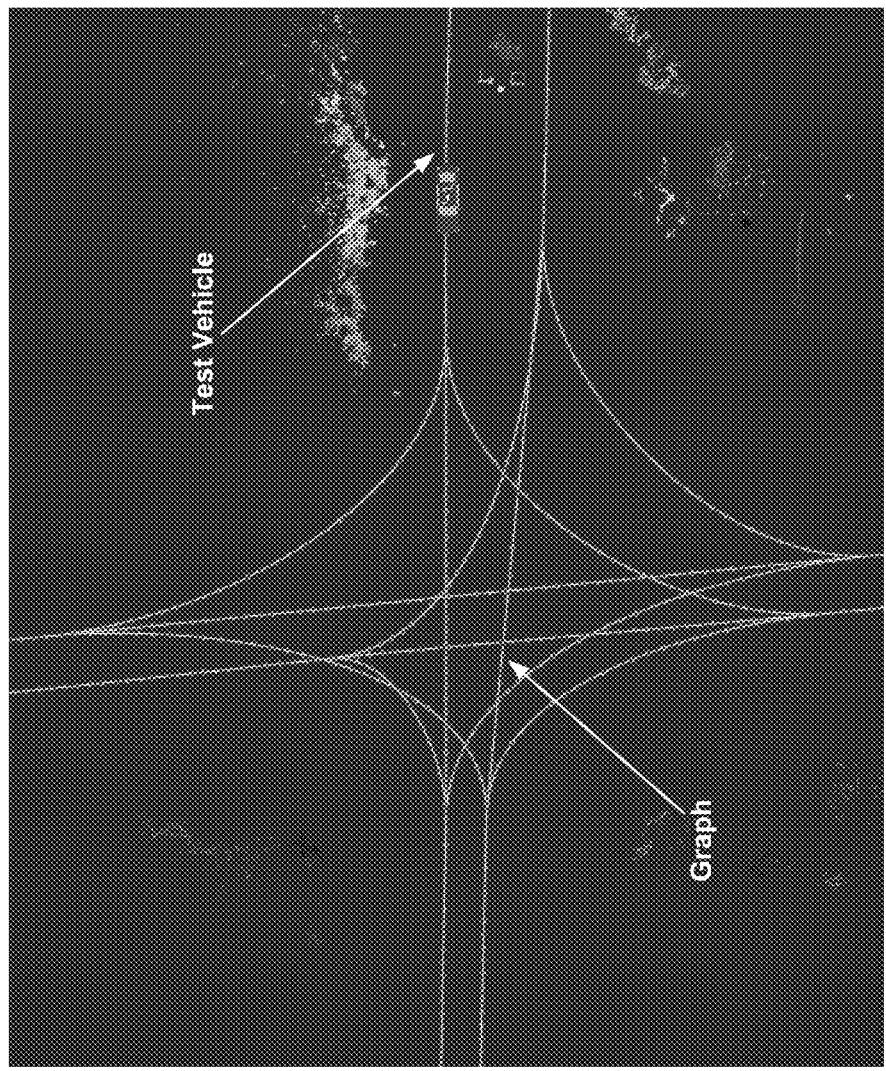
FIG. 10 illustrates an exemplary graph.

A typical graph is shown in FIGS. 7-9, as well as FIG. 10.

Figure 11:
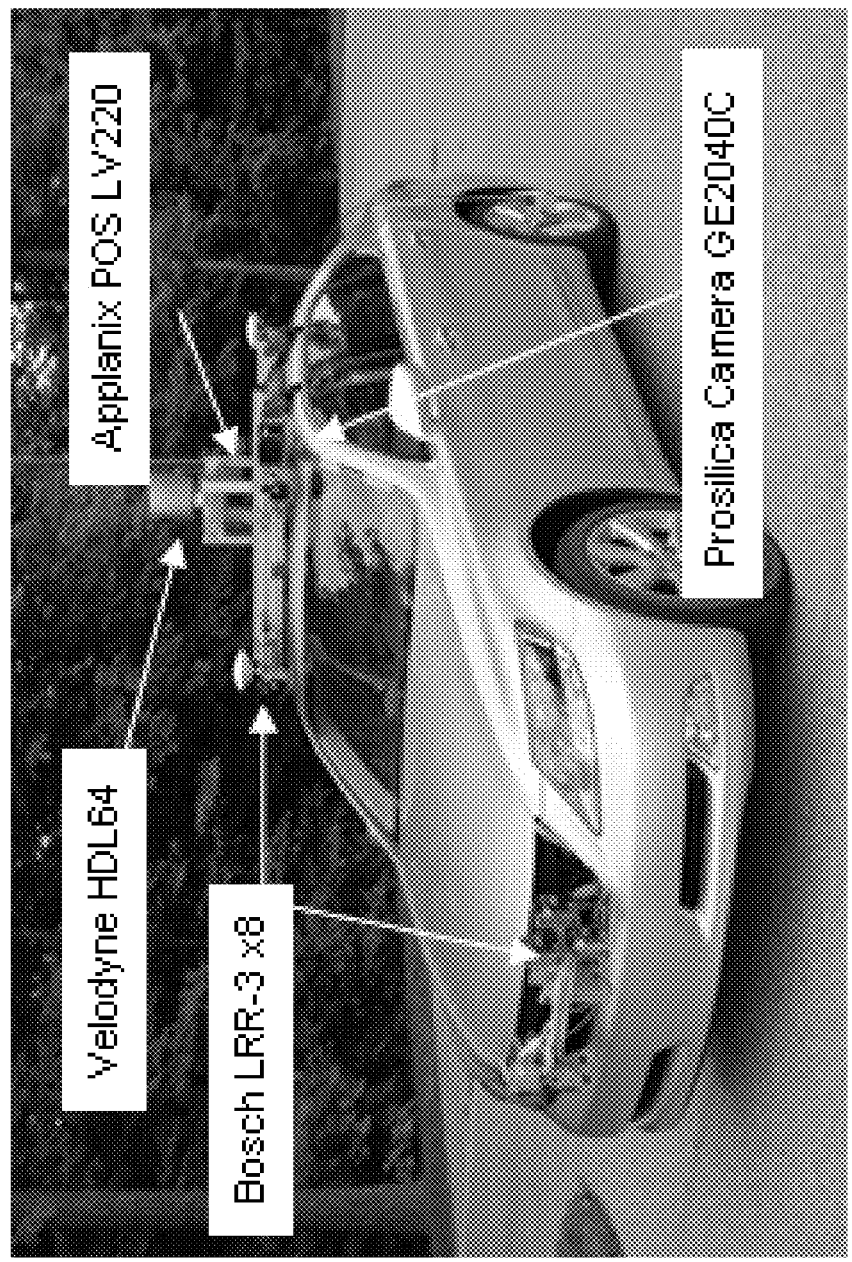
FIG. 11 illustrates an exemplary autonomous/test vehicle.
Figure 12:
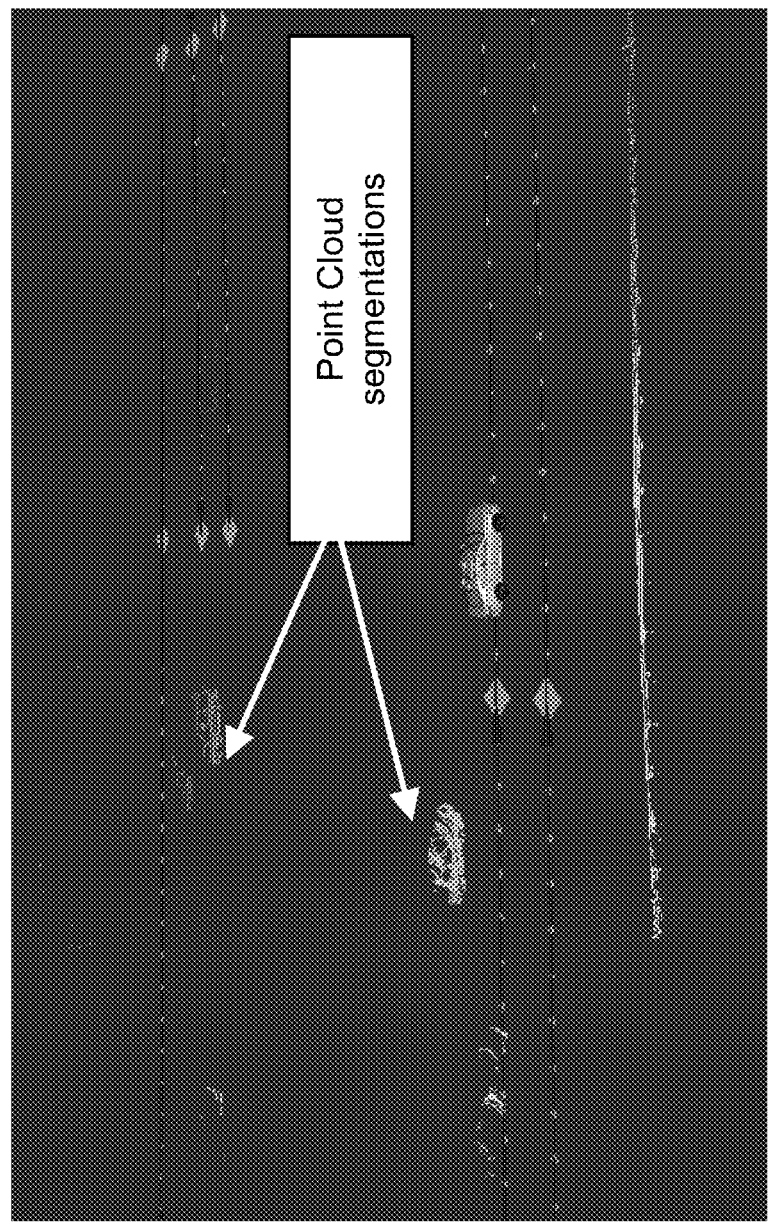
FIG. 12 illustrates exemplary point cloud segmentations.

An exemplary autonomous vehicle is shown in FIG. 11, which shows a test vehicle instrumented with Light Detection and Ranging (Lidar) manufactured by Velodyne, an array of long range radar sensors manufactured by Bosch, and Prosillica High Definition Cameras. The Velodyne sensor can give reasonably accurate point cloud data 360° around the vehicle up to a distance of 40 m. Obstacles are segmented out from the point cloud using 3D point cloud perception techniques. An example of point cloud segmentations is shown in FIG. 12.

An array of radar sensors (such as 8 radars) is mounted on the vehicle such that each of the radars has a different orientation. Each radar can have a field of view of ±15° at 50 m and ±6° at a range of about 200 m. Radar directly sends back the detected obstacle position and relative velocity in the coordinate frame of the radar. Since location and velocity of the obstacles are obtained in the radar coordinate frame, it is necessary to transform each obstacle to the vehicle coordinate frame. Finding the right transform for each of the radar unit can be done by a calibration process described below.

Figure 13:
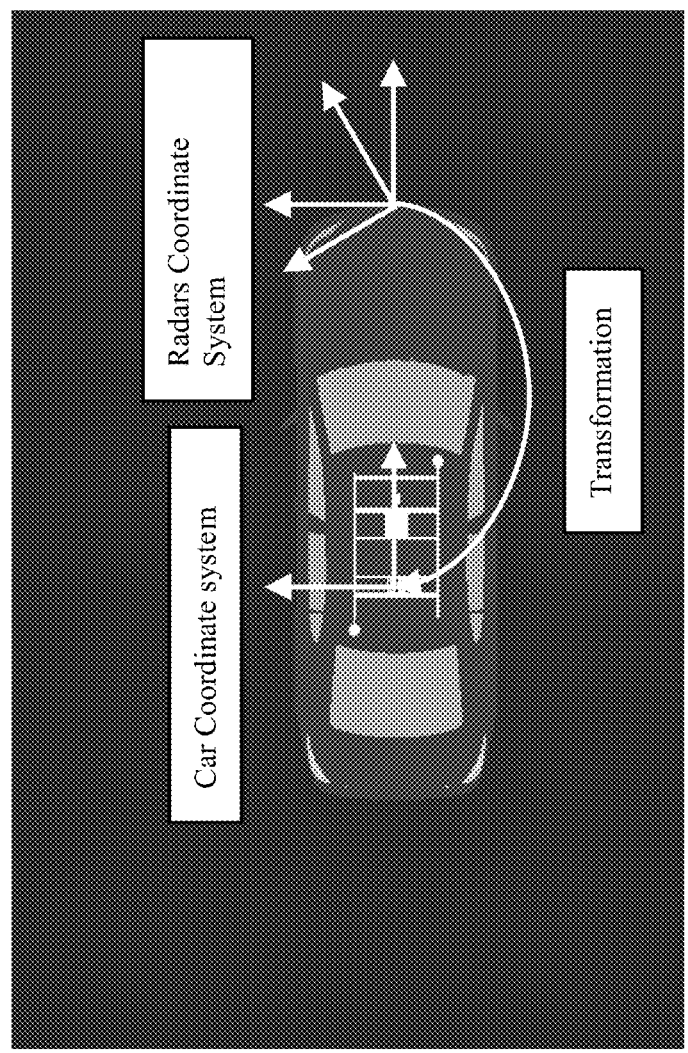
FIG. 13 schematically illustrates a transformation between coordinate systems.

FIG. 13 illustrates schematically the transformation to be performed. All radar sensors have to be calibrated to get an accurate transformation from radar reference frame to the robot's (the car's) reference frame. A semi-automated procedure has been developed for this purpose as described below.

Radar markers which are highly radar reflective are placed in different positions around the vehicle. These positions are marked accurately using LIDAR points. Since the effective range of Velodyne LIDAR is shorter than that of the radars, the vehicle is driven within the Velodyne range to the markers, and the GPS system in the car is used to keep the marker coordinates in the same reference frame. At the same time, obstacle data from the radars is recorded.

Transformation from the radar reference frame to the robot reference frame is given by the following equations:

$$x_r = x_c \cos\theta + y_c \sin\theta + t_x$$

$$y_r = -x_c \sin\theta + y_c \cos\theta + t_y,$$

where $\{x_r, y_r\}$ are obstacle positions in radar reference frame, $\{x_c, y_c\}$ are obstacle positions in the car reference frame, and $t_x$, $t_y$, and $\theta$ are calibration parameters. The parameters $t_x$, $t_y$, and $\theta$ are estimated from the data collected using non-linear least square approximation using a Levenberg-Marquardt algorithm. The least square problem is formulated as a minimization of the following term:

$$err = \sum_i (x_o^i - x_e^i)^2 + (y_o^i - y_e^i)^2,$$

where $\{x_o^i, x_o^i\}$ are $i^{th}$ observed data point and $\{x_c^i, y_c^i\}$ are estimated using the above transformation equation. A calibration accuracy obtained from this particular process is 0.01 m.

Consistent with the above, tracking can be performed by a three-phase process: association, initialization, and update.

Association Phase

Each detected obstacle is projected on to the graph. Obstacles which are not close to the graph are neglected. Each obstacle might have multiple observations from different sensors, and this information needs to be fused. Also, since the sensors work asynchronously, a simple nearest neighbor approach cannot be used. In order to do a correct temporal assignment, each observation is projected and corrected along the graph for the current timestamp. These corrected observations are then associated with the current list of targets using the nearest neighbor assignment. Multiple observations are assigned to the list of observations for each target.

Initialization Phase

If no target is assigned for a valid observation, the a new target is created. Its Kalman state is initialized to the corrected observation. A state of the Kalman filter is a travel distance along the lane, velocity and acceleration of the obstacle. In case of a Velodyne-only observation, since velocity is not observed, it is estimated in a first couple of iterations.

Update Phase

Each target has an independent Kalman filter associated with it. A best observation is selected from the list of observations for each target, and the full Kalman update is carried out as given below (see *A new approach to linear filtering and prediction problems*, Journal of Basic Engineering 82, by Kalman, R. E):

$$\hat{x}_{k|k-1} = F_k \hat{x}_{k-1|k-1}$$

$$P_{k|k-1} = F_k P_{k-1|k-1} F_k^T + Q_k$$

$$\tilde{y}_k = z_k - H_k \hat{x}_{k|k-1}$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}_k$$

$$P_{k|k} = (I - K_k H_k) P_{k \oplus k-1}$$

If no observation is obtained for certain targets for some prescribed period of time, then they are dropped from the tracking system.

Pseudo-code for a tracking algorithm is presented below:
1. Assign all observations with their corresponding timestamps to the list of observations
2. For each observations:
    a. If observation is close enough to the graph, project the observation on the graph.
    b. For each trajectory in the list
        Estimate the position of the trajectory at the timestamp of the observations.
        Assign the observation to the trajectory if it is close to the position of the trajectory at that timestamp.
        If no trajectory is found, create a new trajectory and assign the current observation to the trajectory.
3. For each trajectory in the list:
    a. Select the best observation from the list of observations assigned to the trajectory. This best selection can be carried out heuristically based on sensor accuracy, time delay etc.
    b. Do Kalman filter prediction (prior) step to the timestamp of best observations. Note that this could move the filter back in time.
    c. Do Kalman filter measurement (posterior) update using the true value of the observation.

Do Kalman filter prediction step again to the current timestamp value to estimate the current position on the trajectory.

Figure 14:
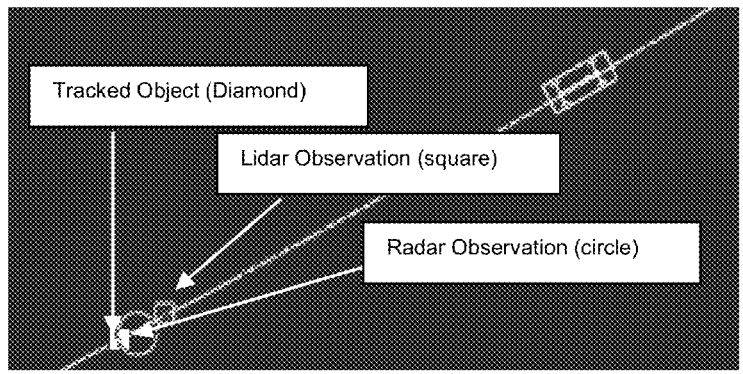
FIGS. 14-16 are graphical illustrations of a tracking system operating in tracking various targets with various sensors in various environments.
Figure 15:
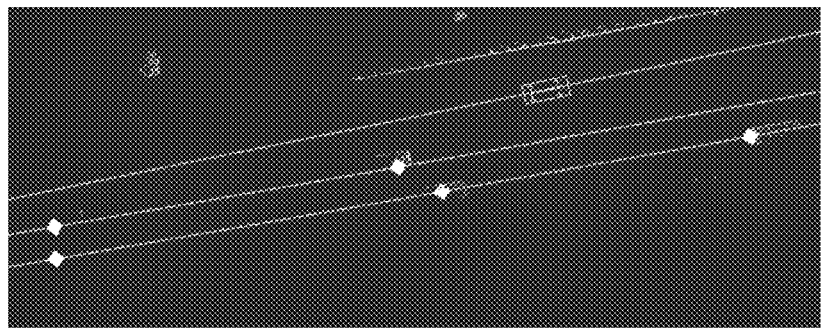
Figure 16:
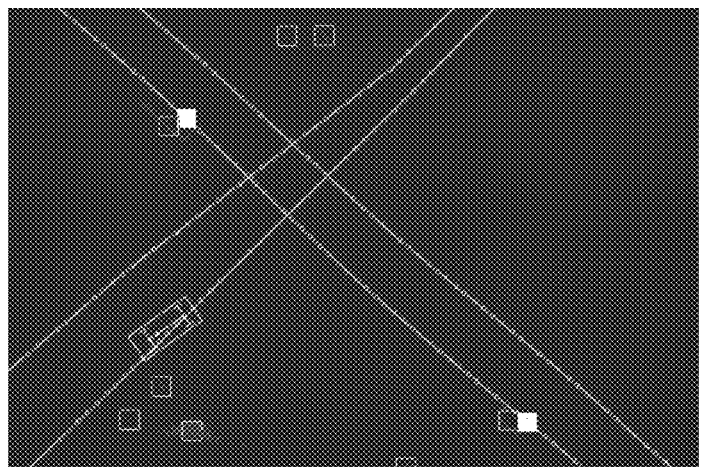

FIGS. 14-16 illustrate various aspects of the algorithm(s) discussed above. FIG. 14 illustrates asynchronous/delay observations, where the circle is a radar observation, a square is a lidar observation, which are delayed due to processing, but a final graph track target (diamond) has been correctly updated. FIG. 15 illustrates tracking of cars on highways, where diamonds show the tracked targets. FIG. 16 illustrates tracking of cars at intersections, where diamonds show the tracked targets.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A controller for a vehicle, comprising a processor configured to:
   receive a first sensor input from a first sensor and a second sensor input from a second sensor, the first and second sensors having, respectively, different first and second modalities and the first and second sensors being local to the vehicle;
   detect, synchronously, first and second observations of a target from, respectively, the first and second sensor inputs, the first and second observations being from a perspective of the vehicle;
   generate a graph network from a road map of a road network of an area in which the vehicle is present and an acquired position of the vehicle, wherein the graph network includes one dimensional lanes as links between nodes;
   project the detected first and second observations of the target onto the graph network;
   associate the first and second observations with the target on the graph network, the target having a trajectory on the graph network, wherein the trajectory of the target is based on one of the one dimensional lanes;
   select either the first or the second observation of the target as a best observation of the target based on characteristics of the first and second sensors; and
   estimate a current position of the target by performing a prediction based on the best observation and a current timestamp.

2. The controller according to claim 1, wherein the first and second observations are associated with the target by generating a new target on the graph network when the first and second observations are not within a predefined distance of a currently tracked target.

3. The controller according to claim 1, wherein the first sensor is a lidar sensor, and the second sensor is a radar sensor.

4. The controller according to claim 1, wherein the current position of the target is estimated by performing a Kalman filter prediction process.

5. The controller according to claim 1, wherein the characteristics of the first and second sensors include a time delay for processing the sensor data and an accuracy in detecting valid obstacles by the processing of the sensor data.

6. The controller according to claim 1, wherein the target is tracked, by current position updates, through successive observations by the first and second sensors, and the target is removed from being tracked when no observation is observed for the target for a defined time period.

7. The controller according to claim 1, wherein the detected first and second observations are projected onto the graph network by transforming respective coordinate systems of the first and second sensor inputs into a common coordinate system of the vehicle.

8. The controller according to claim 1, wherein the controller stores a list of targets in a target list in a memory of the controller, and the target list is queried to associate observations with the targets.

9. The controller according to claim 1, wherein synchronous detection of observations is restricted to points on or within a margin of error from a lane of the graph network.

10. The controller according to claim 1, wherein tracking of targets is restricted to points on or within a margin of error from a lane of the graph network.

11. The controller according to claim 1, wherein the detected first and second observations are projected onto the graph network by correcting the detected first and second observations to reflect a current timestamp, adjusting a position of the first and second observations on the graph network to account for a time delay between acquiring respective sensor data and projecting resulting observations onto the graph network.

12. A vehicle system, comprising:
   a first sensor and a second sensor, each having, respectively, different first and second modalities, the first and second sensors being local to the vehicle; and
   a controller including a processor configured to:
      receive a first sensor input from the first sensor and a second sensor input from the second sensor;
      detect, synchronously, first and second observations of a target from, respectively, the first and second sensor inputs, the first and second observations being from a perspective of the vehicle;
      generate a graph network from a road map of a road network of an area in which the vehicle is present and an acquired position of the vehicle, wherein the graph network includes one dimensional lanes as links between nodes;
      project the detected first and second observations onto the graph network;
      associate the first and second observations with the target on the graph network, the target having a trajectory on the graph network, wherein the trajectory of the target is based on one of the one dimensional lanes;
      select either the first or the second observation of the target as a best observation of the target based on characteristics of the first and second sensors; and
      estimate a current position of the target by performing a prediction based on the best observation and a current timestamp.

13. A method, comprising:
   receiving a first sensor input from a first sensor and a second sensor input from a second sensor, the first and second sensors having, respectively, different first and second modalities and the first and second sensors being local to a vehicle;

detecting, synchronously, first and second observations of a target from, respectively, the first and second sensor inputs, the first and second observations being from a perspective of the vehicle;

generating a graph network from a road map of a road network of an area in which the vehicle is present and an acquired position of the vehicle, wherein the graph network includes one dimensional lanes as links between nodes;

projecting the detected first and second observations onto a graph network;

associating the first and second observations with the target on the graph network, the target having a trajectory on the graph network, wherein the trajectory of the target is based on one of the one dimensional lanes;

selecting either the first or the second observation of the target as a best observation of the target based on characteristics of the first and second sensors; and estimating a current position of the target by performing a prediction based on the best observation and a current timestamp.

* * * * *